(12) United States Patent
Okumoto et al.

(10) Patent No.: US 6,983,349 B2
(45) Date of Patent: Jan. 3, 2006

(54) METHOD, SYSTEM, AND STORAGE CONTROLLER FOR CONTROLLING SHARED MEMORIES

(75) Inventors: Katsuhiro Okumoto, Kanagawa (JP); Hisao Honma, Kanagawa (JP)

(73) Assignee: Hitachi, Ltd., Tokyo (JP)

(*) Notice: Subject to any disclaimer, the term of this patent is extended or adjusted under 35 U.S.C. 154(b) by 296 days.

(21) Appl. No.: 10/428,198

(22) Filed: Apr. 30, 2003

(65) Prior Publication Data

US 2003/0204683 A1 Oct. 30, 2003

(30) Foreign Application Priority Data

Apr. 30, 2002 (JP) ............................. 2002-128590

(51) Int. Cl.
*G06F 12/00* (2006.01)
(52) U.S. Cl. .................... 711/147; 711/118; 711/130; 709/213
(58) Field of Classification Search ............... 711/100, 711/117, 118, 119, 130, 147, 154, 200; 709/213, 709/214, 217
See application file for complete search history.

(56) References Cited

U.S. PATENT DOCUMENTS

| | | | | |
|---|---|---|---|---|
| 4,710,868 A | * | 12/1987 | Cocke et al. | 710/316 |
| 5,408,629 A | * | 4/1995 | Tsuchiva et al. | 711/151 |
| 5,485,579 A | * | 1/1996 | Hitz et al. | 709/221 |
| 5,606,679 A | * | 2/1997 | Cohn et al. | 711/4 |
| 5,790,775 A | * | 8/1998 | Marks et al. | 714/9 |
| 5,802,547 A | * | 9/1998 | Legvold | 711/100 |
| 5,887,164 A | * | 3/1999 | Gupta | 713/2 |
| 5,949,785 A | * | 9/1999 | Beasley | 370/398 |
| 6,052,795 A | * | 4/2000 | Murotani et al. | 714/3 |
| 6,065,037 A | * | 5/2000 | Hitz et al. | 709/200 |
| 6,247,099 B1 | * | 6/2001 | Skazinski et al. | 711/141 |
| 6,324,595 B1 | * | 11/2001 | Tsai et al. | 710/15 |
| 6,353,869 B1 | * | 3/2002 | Ofer et al. | 710/200 |
| 6,363,462 B1 | * | 3/2002 | Bergsten | 711/162 |
| 6,446,175 B1 | * | 9/2002 | West et al. | 711/162 |
| 6,457,098 B1 | * | 9/2002 | DeKoning et al. | 711/114 |
| 6,477,618 B2 | * | 11/2002 | Chilton | 711/113 |
| 6,490,659 B1 | * | 12/2002 | McKean et al. | 711/141 |
| 6,549,988 B1 | * | 4/2003 | Gertner | 711/141 |
| 6,564,294 B1 | * | 5/2003 | Fujibayashi et al. | 711/114 |
| 6,629,204 B2 | * | 9/2003 | Tanaka et al. | 711/114 |
| 6,636,950 B1 | * | 10/2003 | Mithal et al. | 711/147 |

(Continued)

FOREIGN PATENT DOCUMENTS

JP 04 000628 * 1/1992

(Continued)

*Primary Examiner*—Tuan V. Thai
(74) *Attorney, Agent, or Firm*—Townsend and Townsend and Crew LLP

(57) ABSTRACT

A method for controlling shared memories permits I/O data exchange among storage controllers. A storage controller is provided for each of a plurality of disk array devices. Each storage controller includes at least one shared memory. Each shared memory stores information about the disk array devices. On each shared memory, addresses of the shared memories of other storage controllers are stored. An I/O request is received from a host device with one storage controller A. The storage controller A identifies an address of a shared memory managing a volume that is a target of the request. If the address is of a shared memory of another storage controller B, the storage controller A issues an instruction to a switching device to establish a connection path between the storage controller A's memory and the storage controller B's memory. The host device is notified that a connection path has been established.

3 Claims, 3 Drawing Sheets

U.S. PATENT DOCUMENTS

| | | | |
|---|---|---|---|
| 6,647,461 B2 * | 11/2003 | Fujimoto et al. | 711/114 |
| 6,718,448 B1 * | 4/2004 | Ofer | 711/163 |
| 2001/0002480 A1 * | 5/2001 | Dekoning et al. | 711/130 |
| 2001/0049774 A1 * | 12/2001 | Otterness et al. | 711/148 |
| 2003/0046460 A1 | 3/2003 | Inoue et al. | |
| 2003/0110354 A1 * | 6/2003 | Tanaka et al. | 711/114 |
| 2003/0110355 A1 * | 6/2003 | Fujimoto et al. | 711/114 |
| 2003/0163655 A1 * | 8/2003 | McKean et al. | 711/154 |
| 2003/0182516 A1 | 9/2003 | Fujimoto | |
| 2003/0196037 A1 * | 10/2003 | Obara et al. | 711/114 |
| 2003/0212860 A1 | 11/2003 | Jiang et al. | |
| 2003/0221077 A1 | 11/2003 | Ohno et al. | |
| 2004/0064637 A1 * | 4/2004 | Fujibayashi et al. | 711/113 |
| 2004/0107381 A1 * | 6/2004 | Bomfim | 714/404 |
| 2005/0050268 A1 * | 3/2005 | Yoshida | 711/114 |

FOREIGN PATENT DOCUMENTS

| | | |
|---|---|---|
| JP | 11-007359 | 1/1999 |

* cited by examiner

METHOD, SYSTEM, AND STORAGE CONTROLLER FOR CONTROLLING SHARED MEMORIES

CROSS REFERENCE TO RELATED APPLICATIONS

The present application claims priority upon Japanese Patent Application No. 2002-128590 filed Apr. 30, 2002, which is herein incorporated by reference.

BACKGROUND OF THE INVENTION

1. Field of the Invention

The present invention relates to a method, a system, and a storage controller for controlling shared memories provided in each storage controller to exchange I/O data among the storage controllers that are provided in each of a plurality of disk array devices, which are connected to a network.

2. Description of the Related Art

The burden on computer systems and storages has continuously increased in line with the recent progress in information technologies. Further, there are demands for the computer systems and storages to perform advanced and complicated processes. In view of such a situation, in order to simplify the storages, increase their availability, and meet the increasing requirements for data and applications, importance is now being attached to, for instance, the concept of SANs (Storage Area Networks) and computer clusters. Under these circumstances, storage sharing as well as data sharing is realized. However, the technology for enabling direct data exchange between, for instance, disk array devices composing a SAN has not been established. As a result, various kinds of management information about disk array devices have been managed independently by individual storage controllers for each of the disk array devices.

It is generally true that storage management is facilitated and expedited by interconnecting a plurality of storages via a dedicated network in order to share those storages, as with a SAN. However, host devices, such as application servers, accessing such a storage system or users using those host devices still have to take procedures of designating an address of a specific storage of a disk array device connected to the SAN, informing the address to the Fabric, and acquiring a path to the storage in order to access that storage for use.

More specifically, host devices connected to the SAN recognize the individual disk array devices, as well as the storages that configure each of the disk array devices, as separate storage systems; therefore, it is not possible to access and manage the storages as a single storage system. For such storages, in order to perform various kinds of data exchanging, such coordinating data among the disk array devices or performing remote copying, it is necessary to communicate with a host device via a bus and a channel adapter of the disk array device and acquire a path between the initiator and target. If an enormous amount of data is handled in the above cases, there is a possibility that the bus may be occupied, thereby increasing the processor load excessively and decreasing the system's overall processing efficiency.

Japanese Patent Application Laid-open Publication No. 11-7359 discloses a storage system that comprises a pair of storage controllers but can be seen from an external host computer as a single storage system. In this conventional storage system, the internal buses (or, the "DKC internal networks 137-0, 137-1") of each of the storage controllers ("Sub DKC0", "Sub DKC1") are integrally connected to form an integrated internal network 137. However, since the whole internal buses of the two storage controllers are integrally connected, it is inevitable that the inner configuration of the storage system will become complicated.

SUMMARY OF THE INVENTION

The present invention is intended to solve the problems described above, and it is an object of the present invention to provide a method, a system, and a storage controller for controlling shared memories in order to permit I/O data exchange among storage controllers.

To achieve the above object, one aspect of the present invention provides a method for controlling shared memories to permit I/O data exchange among storage controllers. Here, at least one of the storage controllers is provided for each of a plurality of disk array devices, each of the storage controllers includes at least one of the shared memories, and each of the shared memories is capable of storing information about the disk array devices. The method comprises: on each shared memory of each storage controller, storing addresses of the shared memories of other ones of the storage controllers that could be a target for the I/O data exchange; receiving an I/O request from a host device with one storage controller A among the storage controllers; identifying, with the storage controller A that has received the I/O request, an address of a shared memory that manages a volume which is a target of the I/O request; if the identified address is an address of a shared memory of another storage controller B, issuing from the storage controller A to a switching device an instruction to establish a connection path between the shared memory of the storage controller A and the shared memory of the storage controller B, the switching device being located on a network that interconnects the shared memories of the storage controllers and capable of changing paths between the shared memories in accordance with an address of either the storage controller or the shared memory contained in a packet format of the network; and notifying the host device that a connection path has been established in compliance with the I/O request.

The present invention is capable of providing a method for controlling shared memories to permit I/O data exchange among storage controllers.

Features and objects of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein.

DETAILED DESCRIPTION OF THE INVENTION

Figure 1:
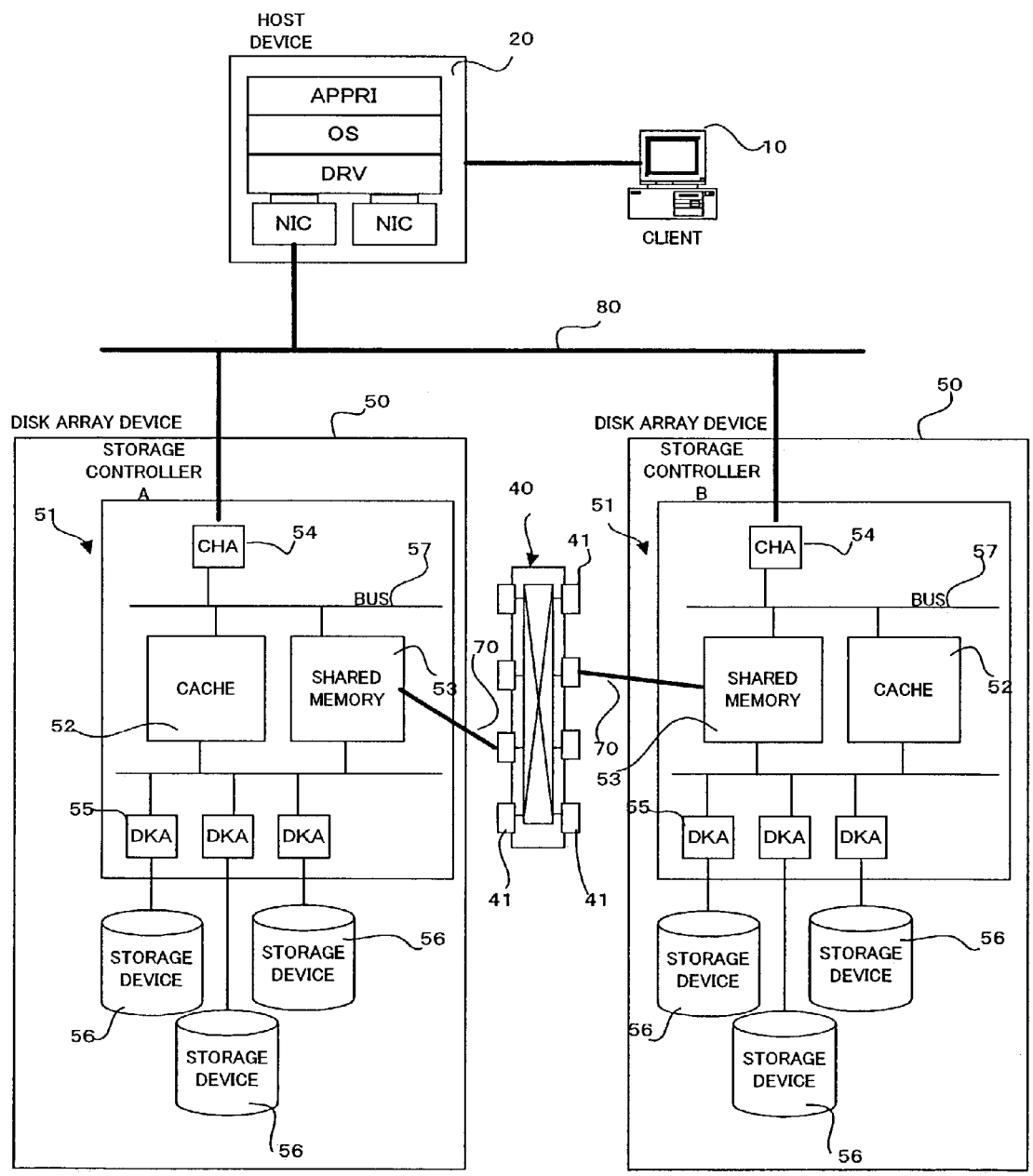
FIG. 1 illustrates the configuration of a network that includes a shared memory control system according to an embodiment of the present invention.

FIG. 1 illustrates the configuration of a network that includes a shared memory control system according to one embodiment of the present invention. The system configuration will now be described in detail with reference to the accompanying drawings. The network includes a client 10, a host device 20, such as an application server, a switching device 40, and disk array devices 50. The host device 20 is connected to storage controllers 51 via an appropriate interface such as SCSI or Fibre Channel.

Each storage controller 51 includes input/output interfaces (which are not shown) for a CPU and the host device 20. Further, each storage controller 51 comprises a cache memory 52, a shared memory 53, a channel adapter 54 (marked "CHA" in the figure) for performing cache control, data transfer control, and other control functions, and disk adapters 55 (marked "DKA" in the figure) for performing input/output control in relation to storage devices 56. In response to a request from the host device 20, the storage controller 51 transmits various control information recorded on the shared memory 53 etc. to the relevant disk adapters 55 for the storage devices 56 via a bus 57, which interconnects the various elements of the controller 51. Note that the control information is used by the processors (not shown) that the channel adapter 54 and disk adapters 55 comprise.

The storage devices 56 are the devices for storage. A plurality of storage devices 56 are shown in the figure. These storage devices 56 are connected to the disk adapters 55 of the storage controller 51 via an appropriate interface such as SCSI. The storage controller 51 manages logical units configured using physical storage areas of these storage devices 56 and also manages the logical storage areas offered by the storage devices using data blocks that are partitioned in these logical units. Note that the logical units are identified by LUNs (Logical Unit Numbers), and the data blocks are designated by block addresses.

Figure 2:
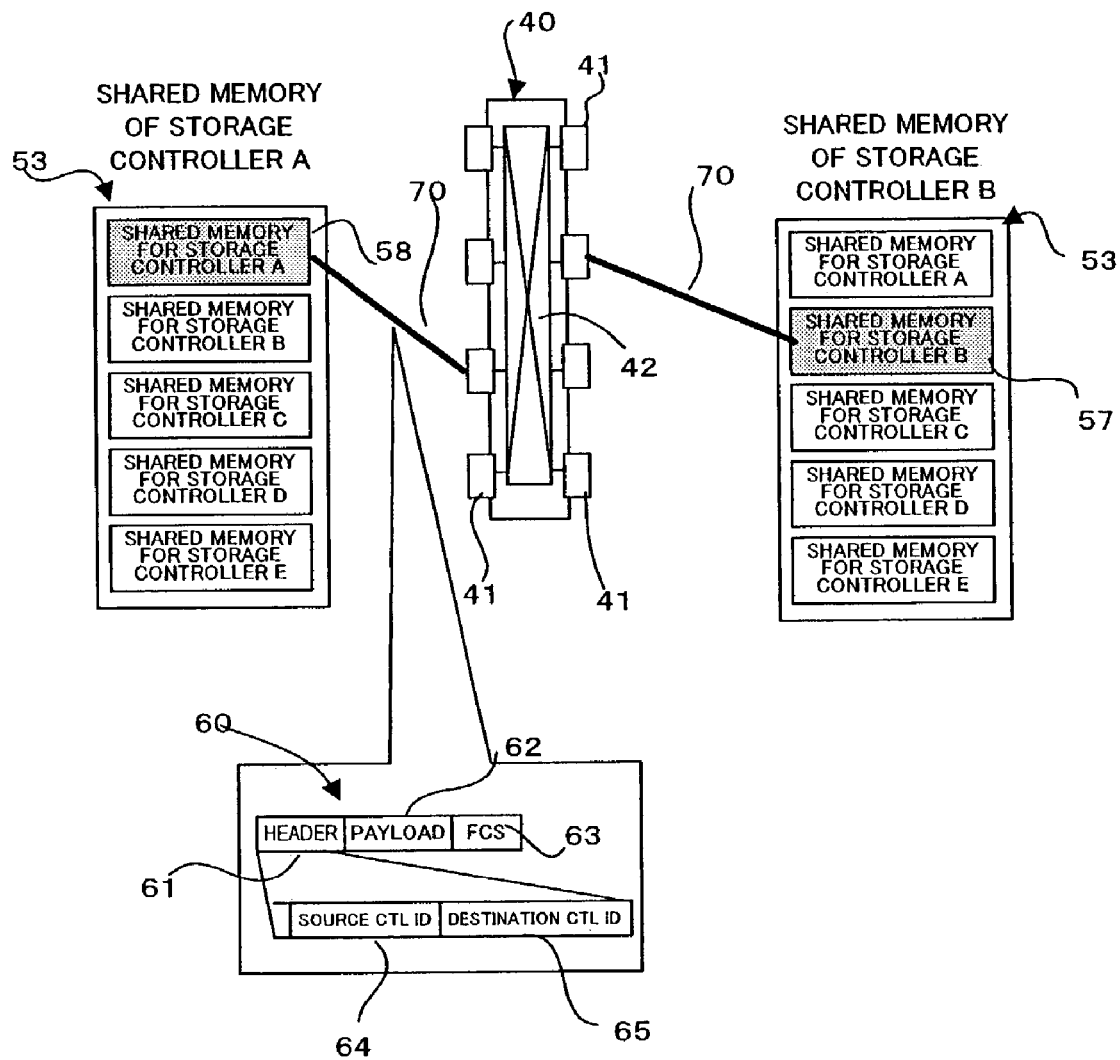
FIG. 2 is a schematic diagram that illustrates how shared memories are interconnected via a switching device of the embodiment.

In the present embodiment, the shared memories 53 of the storage controllers 51 are interconnected via a network 70. A switching device 40 is arranged within the network 70 for changing paths. Thanks to the switching device 40, the path between the shared memories 53 can be established to permit I/O data exchange. As shown in FIG. 1 and FIG. 2, the switching device 40 has a plurality of ports 41 for transmitting/receiving the I/O requests of the host device or the storage controllers 51. A switching section 42 (see FIG. 2) is provided among these transmission/reception ports 41 in order to perform switching among the ports. Each of these ports 41 is equipped with a frame buffer for temporarily storing a received I/O request and a table for storing the IDs and/or the addresses of the storage controllers 51 and/or the shared memories 53.

The process performed by the switching device 40 will now be described. If, for instance, an I/O request is issued to a certain storage device 56 (logical or physical volume) from the client 10, such a request is transferred to a disk array device 50 (which is a part of the system) to which the client 10 is connected via a network 80, via the host device 20, such as an application server. It is assumed that this I/O request is a SCSI packet 60. This SCSI packet 60 is received by a disk array device 50 associated with the host device 20 and then checked to determine which storage device 56 is designated by the request.

As illustrated in FIG. 2, the SCSI packet 60 typically comprises a header section 61 for indicating the IDs 64, 65 of the source storage controller 51 and the destination storage controller 51 (the controllers are marked "CTL"), a payload section 62 in which commands and data to be transmitted are stored, and an FCS (Frame Check Sequence) field 63 for checking whether the SCSI packet 60 is damaged.

If it is determined that the header section 61 of the SCSI packet 60 indicates that the request is directed to a storage device 56 managed by another storage controller, an instruction for establishing a path to the other storage controller is issued to the switching device 40. Upon receipt of the instruction, the switching device 40 performs switching to establish the path to the other storage controller's shared memory.

The storage controllers 51, or the disk array devices 50, are connected to the switching device 40 via their shared memories 53. Therefore, the disk array devices 50 can be freely added, deleted, and changed. Thus, it is possible to freely change the storage capacity or add/delete storages in accordance with the type of the data to be stored and/or the purpose of usage of the storages. Further, the switching device 40 performs a switching process and acquires a path for I/O requests etc. by checking the addresses of the disk array devices 50, storage devices 56 managed by the disk array devices 50, and individual logical volumes. This ensures that no matter which disk array device 50 the host device 20 accesses, a path to other disk array devices 50 will be established, and the host device 20 can access any disk array device 50 through that path. As a result, the bus load and processor load become leveled, thereby contributing toward system efficiency enhancement.

The host device 20 and the client 10 accessing the host device 20 are configured of, for example, a mainframe or a personal computer. Equipped with an appropriate operation system, the host device 20 not only manages and executes applications but also provides data communication by transmitting various data, including I/O requests, to the network via an appropriate driver, such as a SCSI, and a NIC (Network Interface Card).

Although it is assumed that SCSI or other similar protocols can be used for network 80, which connects the host device 20 to disk array devices 50, and network 70, which interconnects the disk array devices 50, it is needless to say that any network and protocol are applicable as far as they implement the present invention.

Figure 3:
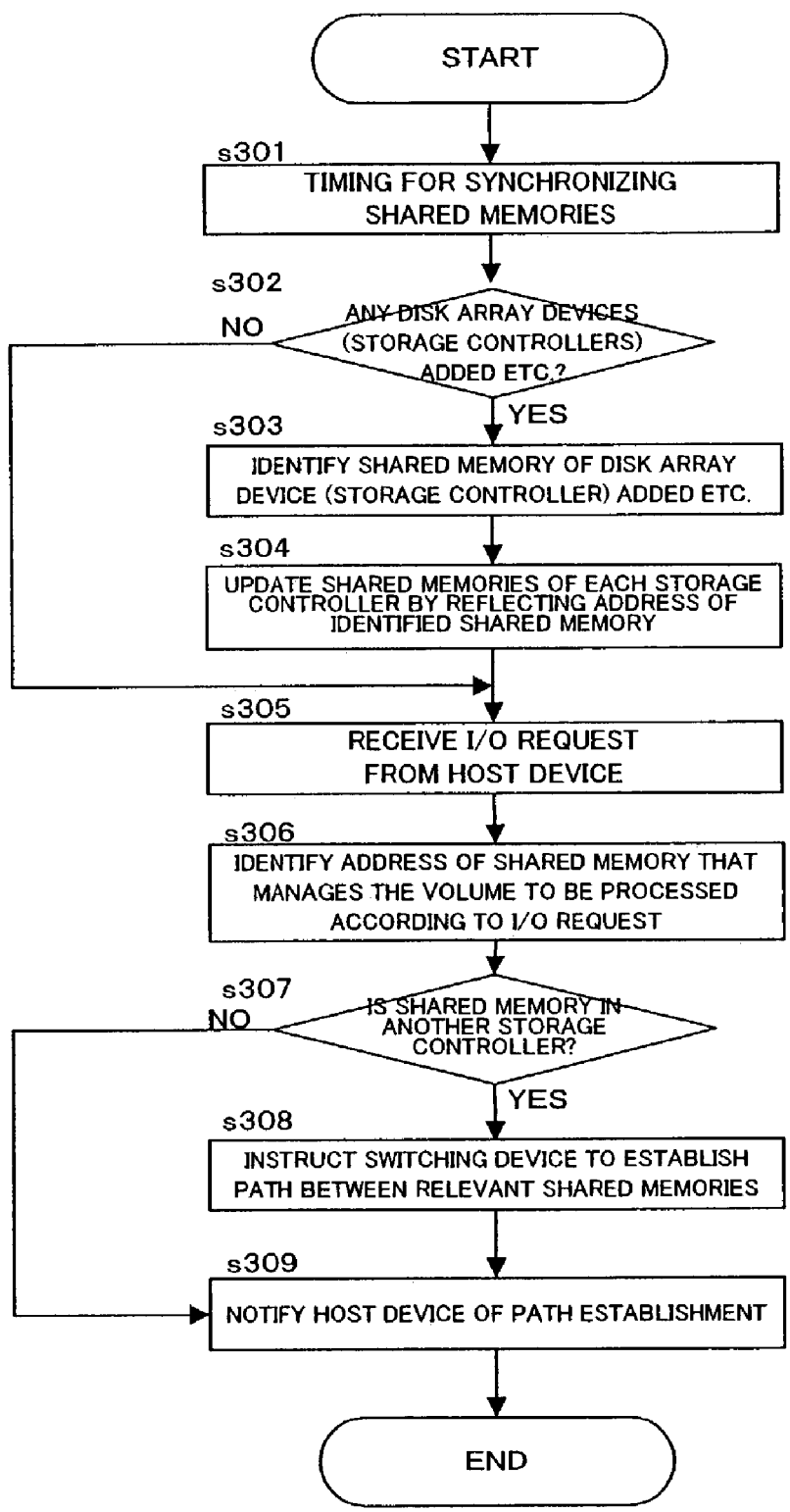
FIG. 3 is a flowchart that illustrates a sequence in which shared memory control is exercised according to the embodiment.

FIG. 3 is a flowchart that illustrates a sequence in which shared memory control is exercised according to the present embodiment. The flow of I/O data exchange among the disk array devices 50, namely, the storage controllers 51, will now be described. Each storage controller reserves, in advance, appropriate areas within its local shared memory by performing address mapping for the shared memories of the other storage controllers connected via the switching device 40. The information about the existence of the other storage controllers and their configuration can be collected, for instance, from a management information base (MIB) using SNMP (Simple Network Management Protocol).

The shared memory 53 provided for each storage controller 51 stores not only the contents of its own but also the contents of the shared memories 53 of the other storage controllers 51 and/or the addresses of the other shared memories 53 and/or the other storage controllers 51. The contents of the shared memories 53 need to be updated at regular intervals or as appropriate to achieve synchronization among the storage controllers 51. It is assumed that the shared memory update may be performed, for instance, at fixed intervals such as once per week or month, when another storage controller is added or deleted, or at disk array device startup or shutdown. Since the memory update/synchronization may be timed as desired, it goes without saying that any timing setting is acceptable.

When the time for synchronizing the shared memories 53 comes (step s301), a storage controller 51 first checks whether any disk array device 50 (storage controller 51) is added or deleted. If it is determined that the number of disk array devices has been changed (step s302), the storage controller 51 identifies the shared memory of the associated disk array device (step s303). In this example, since the controller 51 specifies to which disk array device 50 or storage controller 51 the shared memory belongs, the ID of the specified storage controller 51 or disk array device 50 is identified as the address of the shared memory 53. If the configuration of the disk array devices 50 is unchanged with no disk array device addition/deletion applied (step s302: NO), the shared memory update/synchronization process is terminated.

The address of the shared memory of an added/deleted storage controller is determined in the same manner by all storage controllers and reflected in their respective shared memories (step s304). In reality, the shared memories for storage controllers B through E, as well as the shared memory 58 that is originally provided for the storage controller A, are mapped within the shared memory 53 of storage controller A, as shown in FIG. 2. This also holds true for the other storage controllers such as storage controller B. More specifically, not only the shared memory 57 for the storage controller B but also the shared memories for storage controllers A and C through E are mapped within the shared memory 53 of storage controller B. There may be several modes for mapping the shared memories for other storage controllers within the local shared memory region: the local shared memory region may completely be synchronized with the shared memory contents for the other storage controllers; or, only the addresses of the shared memories of the other storage controllers, to which paths are to be established in response to an I/O request from the host device 20 etc., may be stored (the latter method can also be referred to as "virtual mapping"). As described above, the contents of each shared memory 53 are updated as needed to achieve synchronization among the storage controllers 51, which are interconnected via the switching device 40.

If, for instance, a certain client 10 transmits an I/O request via the host device 20, the I/O request is first received by the host device 20. The host device 20 then transmits the I/O request to the associated disk array device 50 via the host device's NIC. In the disk array device 50, the channel adapter 54 receives the I/O request from an appropriate I/O interface and confirms it (step s305).

As described above, the I/O request contains the address of a shared memory that manages the volume which is the target of the I/O request. (Here, a "volume" may be storage devices 56 or logical volumes created by partitioning the storage devices 56). After I/O request confirmation (step s306), the storage controller 51 determines, from the shared memory address (that is, the ID of a storage controller) contained in the I/O request, whether the target of the I/O request is itself or other storage controllers (step s307). If the target of the I/O request is itself, the storage controller 51, which has identified the I/O request, establishes a path to the relevant storage device 56 in a normal manner via a disk adapter 55 and reports this to the host device (step s309).

If, on the other hand, the I/O request relates to some other storage controller, the storage controller 51, which has identified the I/O request, sends to the switching device 40 an instruction to establish a path to the shared memory of the storage controller designated by the I/O request (step s308). The switching device 40 receives, for instance, a SCSI packet 60 (which is the entity of the I/O request) via port 41, and stores it in a frame buffer. If, for instance, the information contained in the SCSI packet 60 indicates that the source storage controller ID is A and that the destination storage controller ID is B, the switching device 40 issues a switching instruction to the switching section 42, prompting the switching section 42 to perform routing to the shared memory of storage controller B. When a path is established by means of switching, this is reported to the associated host device (step s309), and the SCSI packet 60 is transmitted from the frame buffer to the shared memory of storage controller B to perform an I/O process.

With the shared memory control method of the present invention, it is possible to provide high-speed data coordination among storage controllers 51 without occupying the path to a host device. This shared memory control method is capable of distributing data among a plurality of clusters, such as disk array devices, for load leveling purposes, updating the contents of shared memories in accordance with a change in the number of disk array devices 50 connected via switching device 40, and increasing the efficiency of data distribution. Further, when this shared memory control method is used for data backup purposes, the degree of I/O efficiency decrease can be minimized by creating a snapshot in a separate cluster and making a switching device choose between a path for accessing the snapshot and a path for accessing the primary volume. In addition, by storing backup of data for each cluster (e.g., disk array device) in a different cluster, the availability increases. If the update sequence is managed for such data backup, cluster failover can be realized as well.

To achieve the aforementioned object, the following alternative embodiments may be utilized to implement the present invention.

In one alternative embodiment, the above shared memory control method may include the following: upon installation of another storage controller, updating and synchronizing contents of each of the shared memories by registering in each of the shared memories an address of a shared memory of the installed storage controller, and upon deletion of another storage controller, updating and synchronizing contents of each of the shared memories by deleting from each of the shared memories an address of a shared memory of the deleted storage controller.

In another alternative embodiment, the above shared memory control method may be executed so as to perform the above-mentioned updating and synchronizing of the contents of the shared memories at a predetermined timing, upon disk array device startup, or upon disk array device shutdown.

Another alternative embodiment of the present invention provides a system for controlling shared memories to permit I/O data exchange among storage controllers, comprising: at least two disk array devices, each of the disk array devices including at least one storage controller, the storage controller including at least one shared memory for storing information about the disk array devices; and a switching device that is capable of interconnecting the shared memories of the storage controllers and capable of changing paths between the shared memories. Here, on each shared memory of each storage controller, addresses of the shared memories of other ones of the storage controllers that could be a target for the I/O data exchange are stored. One storage controller A among the storage controllers receives an I/O request from a host device. The storage controller A that has received the I/O request identifies an address of a shared memory that manages a volume which is a target of the I/O request. If the identified address is an address of a shared memory of another storage controller B, the storage controller A issues to the switching device an instruction to establish a connection path between the shared memory of the storage controller A and the shared memory of the storage controller B. The host device is notified that a connection path has been established in compliance with the I/O request.

Further, another embodiment of the present invention provides a storage controller for controlling shared memories to permit I/O data exchange with other storage controllers, comprising: at least one shared memory that is connected to a switching device, the switching device being capable of interconnecting shared memories of a plurality of storage controllers and capable of changing paths between the shared memories. Here, on the shared memory of the storage controller, addresses of the shared memories of other ones of the storage controllers that could be a target for the I/O data exchange are stored. The storage controller receives an I/O request from a host device. Having received the I/O request, the storage controller identifies an address of a shared memory that manages a volume which is a target of the I/O request. If the identified address is an address of a shared memory of another storage controller B, the storage controller issues to the switching device an instruction to establish a connection path between its own shared memory and the shared memory of the storage controller B. The storage controller notifies the host device that a connection path has been established in compliance with the I/O request.

According to the present invention, it becomes possible to provide a method, a system, and a storage controller for controlling shared memories so as to enable I/O data exchange among storage controllers.

Although the preferred embodiment of the present invention has been described in detail, it should be understood that various changes, substitutions and alterations can be made therein without departing from spirit and scope of the inventions as defined by the appended claims.

What is claimed is:

1. A method for controlling shared memories to permit I/O data exchange among storage controllers, at least one of said storage controllers being provided for each of a plurality of disk array devices, each of said storage controllers including at least one of said shared memories, each of said shared memories being capable of storing information about said disk array devices, said method comprising:

on each said shared memory of each said storage controller, storing addresses of said shared memories of other ones of said storage controllers that could be a target for said I/O data exchange;

receiving an I/O request from a host device with one storage controller A among said storage controllers;

identifying, with said storage controller A that has received said I/O request, an address of a shared memory that manages a volume which is a target of said I/O request;

if said identified address is an address of a shared memory of another storage controller B, issuing from said storage controller A to a switching device an instruction to establish a connection path between the shared memory of said storage controller A and the shared memory of said storage controller B, said switching device interconnecting said shared memories of said storage controllers;

establishing a connection path between the share memory of said storage controller A and the shared memory of said storage controller B by said switching device according to said instructions;

sending, by said storage controller A, said 1/0 request to the shared memory of said storage controller B via said switching device, upon installation of another storage controller, updating and synchronizing contents of each of said shared memories by registering in each of said shared memories an address of a shared memory of the installed storage controller, and upon deletion of another storage controller, updating and synchronizing contents of each of said shared memories by deleting from each of said shared memories an address of a shared memory of the deleted storage controller; and wherein said updating and synchronizing of the contents of said shared memories is performed at a predetermined timing, upon disk array device startup, or upon disk array device shutdown.

2. A system for controlling shared memories to permit I/O data exchange among storage controllers, comprising:

at least two disk array devices, each of said disk array devices including at least one storage controller, said storage controller including at least one shared memory for storing information about said disk array devices; and a switching device that is capable of interconnecting said shared memories of said storage controllers and capable of changing paths between said shared memories, wherein, on each said shared memory of each said storage controller, addresses of said shared memories of other ones of said storage controllers that could be a target for said I/O data exchange are stored, one storage controller A among said storage controllers receives an I/O request from a host device, said storage controller A that has received said I/O request identifies an address of a shared memory that manages a volume which is a target of said I/O request, if said identified address is an address of a shared memory of another storage controller B, said storage controller A issues to said switching device an instruction to establish a connection path between the shared memory of said storage controller A and the shared memory of said storage controller B, said switching device establishes a connection path between the shared memory of said storage controller A and the shared memory of said storage controller B according to said instructions;

said storage controller A sends said 1/0 request to the shared memory of said storage controller B via said switching device;

wherein upon installation of another storage controller, contents of each of said shared memories are updated and synchronized by registering in each of said shared memories an address of a shared memory of the installed storage controller, and upon deletion of another storage controller, contents of each of said shared memories are updated and synchronized by deleting from each of said shared memories an address of a shared memory of the deleted storage controller; and wherein said updating and synchronizing of the contents of said shared memories is performed at a predetermined timing, upon disk array device startup, or upon disk array device shutdown.

3. A storage controller for controlling shared memories to permit I/O data exchange with other storage controllers, comprising:
- at least one shared memory that is connected to a switching device, said switching device being capable of interconnecting shared memories of a plurality of storage controllers and capable of changing paths between said shared memories, wherein,
- on said shared memory of said storage controller, addresses of said shared memories of other ones of said storage controllers that could be a target for said I/O data exchange are stored,
- said storage controller receives an I/O request from a host device, having received said I/O request, said storage controller identifies an address of a shared memory that manages a volume which is a target of said I/O request,
- if said identified address is an address of a shared memory of another storage controller B, said storage controller issues to said switching device an instruction to establish a connection path between its own shared memory and the shared memory of said storage controller B,
- said storage controller sends said I/O requests to shared memory of said storage controller B via said switching device;
- wherein upon installation of another storage controller, contents of each of said shared memories are updated and synchronized by registering in each of said shared memories an address of a shared memory of the installed storage controller, and upon deletion of another storage controller, contents of each of said shared memories are updated and synchronized by deleting from each of said shared memories an address of a shared memory of the deleted storage controller, and
- wherein said updating and synchronizing of the contents of said shared memories is performed at a predetermined timing, upon disk array device startup, or upon disk array device shutdown.

* * * * *